United States Patent
Itou et al.

(10) Patent No.: US 12,030,192 B2
(45) Date of Patent: Jul. 9, 2024

(54) MOTION MODEL CALCULATION DEVICE, CONTROL DEVICE, JOINT MECHANISM, AND MOTION MODEL CALCULATION METHOD

(71) Applicant: NEC Corporation, Tokyo (JP)

(72) Inventors: Takehiro Itou, Tokyo (JP); Hiroyuki Oyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 463 days.

(21) Appl. No.: 17/413,635

(22) PCT Filed: Feb. 8, 2019

(86) PCT No.: PCT/JP2019/004589
§ 371 (c)(1),
(2) Date: Jun. 14, 2021

(87) PCT Pub. No.: WO2020/161880
PCT Pub. Date: Aug. 13, 2020

(65) Prior Publication Data
US 2022/0072708 A1    Mar. 10, 2022

(51) Int. Cl.
*B25J 9/16*    (2006.01)

(52) U.S. Cl.
CPC .................................. *B25J 9/1671* (2013.01)

(58) Field of Classification Search
CPC . B25J 9/1671; B25J 9/1617; B25J 9/06; B25J 13/088; B25J 9/163; G05B 2219/39251; G05B 2219/40527
See application file for complete search history.

(56) References Cited

U.S. PATENT DOCUMENTS

| | | | | |
|---|---|---|---|---|
| 9,844,872 B1 * | 12/2017 | Buschmann | ............. | B25J 9/163 |
| 2008/0188986 A1 * | 8/2008 | Hoppe | .................. | B25J 9/1692 |
| | | | | 901/41 |

(Continued)

FOREIGN PATENT DOCUMENTS

| JP | H05253875 A | 10/1993 |
|---|---|---|
| JP | H0929671 A | 2/1997 |

(Continued)

OTHER PUBLICATIONS

Japanese Office Communication for JP Application No. 2020-570306 mailed on Sep. 27, 2022 with English Translation.

(Continued)

*Primary Examiner* — Kira Nguyen (57) ABSTRACT

What is disclosed is a motion model calculation device which easily creates a motion model for a drive device. The motion model calculation device is connected to a robot arm including a plurality of arms and a joint mechanism which pivotally joins the plurality of arms to a connection part, outputs a predetermined motion command to the joint mechanism, acquires a driving state of the joint mechanism caused by a motion corresponding to the motion command, and calculates, on the basis of the motion command and the driving state, a motion model representing the relationship between an input value representing an input to the joint mechanism and an output value of the joint mechanism with respect to the input.

6 Claims, 5 Drawing Sheets

(56) References Cited

U.S. PATENT DOCUMENTS

| | | | | |
|---|---|---|---|---|
| 2012/0116582 A1* | 5/2012 | Negishi | ............... | B25J 9/1656 |
| | | | | 700/245 |
| 2014/0316431 A1* | 10/2014 | Hourtash | ............... | A61B 34/37 |
| | | | | 606/130 |
| 2017/0066131 A1* | 3/2017 | Kamikawa | ............ | B25J 9/1697 |
| 2017/0348856 A1* | 12/2017 | Nakaya | ............... | B25J 9/1666 |
| 2018/0229364 A1* | 8/2018 | Wang | ................... | B25J 9/163 |
| 2019/0193265 A1* | 6/2019 | Xiong | ............... | B25J 17/0241 |

FOREIGN PATENT DOCUMENTS

| | | | |
|---|---|---|---|
| JP | H11-143512 | A | 5/1999 |
| JP | 2004240612 | A | 8/2004 |
| JP | 5495919 | B2 | 5/2014 |
| JP | 5525407 | B2 | 6/2014 |
| JP | 2022-510082 | A | 1/2022 |

OTHER PUBLICATIONS

International Search Report for PCT Application No. PCT/JP2019/004589, mailed on Apr. 9, 2019.

* cited by examiner

MOTION MODEL CALCULATION DEVICE, CONTROL DEVICE, JOINT MECHANISM, AND MOTION MODEL CALCULATION METHOD

This application is a National Stage Entry of PCT/JP2019/004589 filed on Feb. 8, 2019, the contents of all of which are incorporated herein by reference, in their entirety.

TECHNICAL FIELD

The present invention relates to a motion model calculation device, a control device, a joint mechanism, a motion model calculation method, and a recording medium storing a program.

BACKGROUND ART

A control device for a robot causes a predetermined portion included in the robot to move to a target position by controlling the driving of joint mechanisms provided in the robot. In order to control the driving of the joint mechanisms, generating a motion model for each of the joint mechanisms is required. A motion model for a joint mechanism is information used for deriving the correspondence between an input signal value input to the joint mechanism and an output when the input signal value is input. Patent Document 1 describes a technique for generating such a motion model.

Patent Document 1 describes a technique for generating a motion model for estimating a three-dimensional posture of an estimation target such as a person from image data.

Also, Patent Document 2 describes a technique for automatically generating sensing motion data for a task manipulator required for a sensing task for correcting an error between the actual task work information of a task manipulator and the teaching data of the task work on a computer.

PRIOR ART DOCUMENTS

Patent Documents

[Patent Document 1]
Japanese Patent No. 5525407
[Patent Document 2]
Japanese Patent No. 5495919

SUMMARY OF INVENTION

Problems to be Solved by the Invention

Incidentally, among the above-described robots, there are robots including a robot arm having a plurality of arms and joint mechanisms which pivotally join the plurality of arms to a connection part. For this robot arm, a long robot arm can be achieved by alternately joining joint mechanisms and arms. If joint mechanisms and arms are joined to increase the length of a certain predetermined robot arm, a control device configured to control the robot arm needs to control the robot arm using a motion model different from a motion model which has been used before this joining. A simple generation of a motion model is required for a robot arm whose length is changeable by attachment and detachment of joint mechanism and arms.

Therefore, an object of the present invention is to provide a motion model calculation device, a control device, a joint mechanism, a motion model calculation method, and a recording medium storing a program capable of solving the above-described problems.

Means for Solving the Problems

According to a first aspect of the present invention, there is provided a motion model calculation device which is connected to a robot arm including a plurality of arms and a joint mechanism which pivotally joins the plurality of arms to a connection part, the motion model calculation device including: a command means for outputting a predetermined motion command to the joint mechanism; an acquisition means for acquiring a driving state of the joint mechanism caused by a motion corresponding to the motion command; and a calculation means for calculating a motion model representing a relationship between an input value representing an input to the joint mechanism and an output value of the joint mechanism with respect to the input on the basis of the motion command and the driving state.

According to a second aspect of the present invention, there is provided a motion model calculation device which is connected to a robot including a drive device, the motion model calculation device including: a command means for outputting a predetermined motion command to the drive device; an acquisition means for acquiring a driving state of the drive device caused by a motion corresponding to the motion command; and a calculation means for calculating a motion model representing a relationship between an input value representing an input to the drive device and an output value of the drive device with respect to the input on the basis of the motion command and the driving state.

According to a third aspect of the present invention, there is provided a motion model calculation method in a device which is connected to a robot arm including a plurality of arms and a joint mechanism which pivotally joins the plurality of arms to a connection part, the motion model calculation method including: outputting a predetermined motion command to the joint mechanism; acquiring a driving state of the joint mechanism caused by a motion corresponding to the motion command; and calculating a motion model representing a relationship between an input value representing an input to the joint mechanism and an output value of the joint mechanism with respect to the input on the basis of the motion command and the driving state.

According to a fourth aspect of the present invention, there is provided a recording medium storing a program causing a device which is connected to a robot arm including a plurality of arms and a joint mechanism which pivotally joins the plurality of arms to a connection part to implement: a command function for outputting a predetermined motion command to the joint mechanism; an acquisition function for acquiring a driving state of the joint mechanism caused by a motion corresponding to the motion command; and a calculation function for calculating a motion model representing a relationship between an input value representing an input to the joint mechanism and an output value of the joint mechanism with respect to the input on the basis of the motion command and the driving state.

Advantageous Effects of the Invention

According to the present invention, it is possible to easily create a motion model for a joint mechanism included in a robot arm.

EXAMPLE EMBODIMENTS

A control device according to an embodiment of the present invention will be described below with reference to the drawings.

Figure 1:
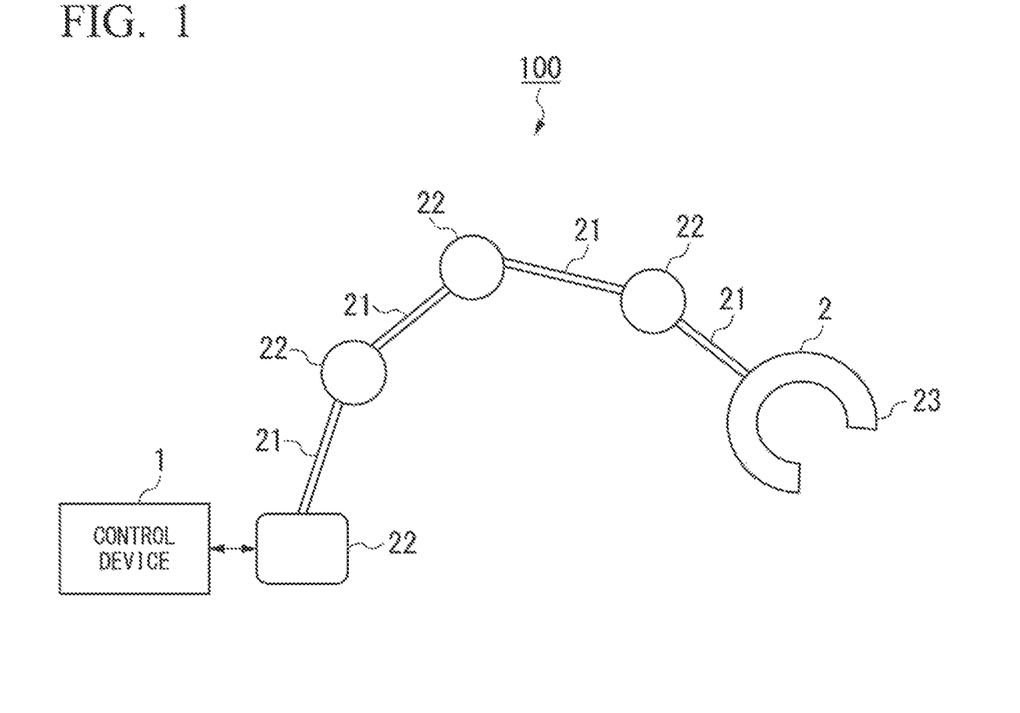
FIG. 1 is a diagram illustrating an outline of a robot system according to an embodiment of the present invention.

FIG. 1 is a diagram illustrating an outline of a robot system 100 including a control device 1 and a robot arm 2 according to the embodiment.

As illustrated in this drawing, the robot system 100 includes the control device 1 and the robot arm 2. The robot arm 2 includes a plurality of arms 21 and joint mechanisms 22 which pivotally join the plurality of arms 21 to a connection part. The connection part of each of the arms 21 may be another arm 21 or a joint mechanism 22 in some cases. The control device 1 can control the driving of joint mechanisms for the robot arm 2.

The joint mechanism 22 includes a first rotation motor which rotates the arm 21 about an axis of the arm 21 which is joined thereto, a second rotation motor which tilts the arm 21 in an orthogonal direction orthogonal to that of the axis of the arm 21 joined to the joint mechanism 22, or the like built thereinto. A grasping mechanism 23 or the like which grasps an object may be provided at a distal end portion of the robot arm 2. Furthermore, the control device 1 is electrically connected to each motor of the joint mechanism 22 and controls driving of the joint mechanisms 22.

The robot arm 2 includes a unit including the arms 21 and the joint mechanism 22 which can be attached thereto and detached therefrom. A user can change length of the robot arm 2 by joining another unit to the robot arm 2 or by removing a unit from the robot arm 2. If the joint mechanism 22 is joined to the robot arm 2, an electric circuit is provided in advance so that the joint mechanism 22 can be connected to the control device 1 through communication.

Figure 2:
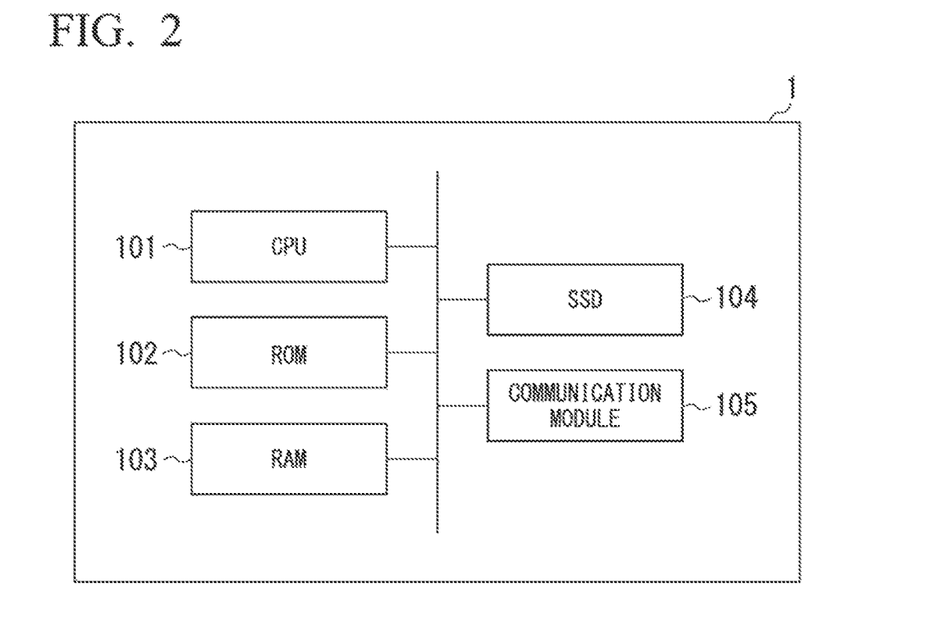
FIG. 2 is a diagram illustrating a hardware configuration of a control device according to the embodiment of the present invention.

FIG. 2 is a diagram illustrating a hardware configuration of the control device 1.

As illustrated in this drawing, the control device 1 is a computer including respective hardware of a central processing unit (CPU) 101 which is a control unit, a read only memory (ROM) 102, a random access memory (RAM) 103, a solid state drive (SSD) 104, a communication module 105, and the like.

Figure 3:
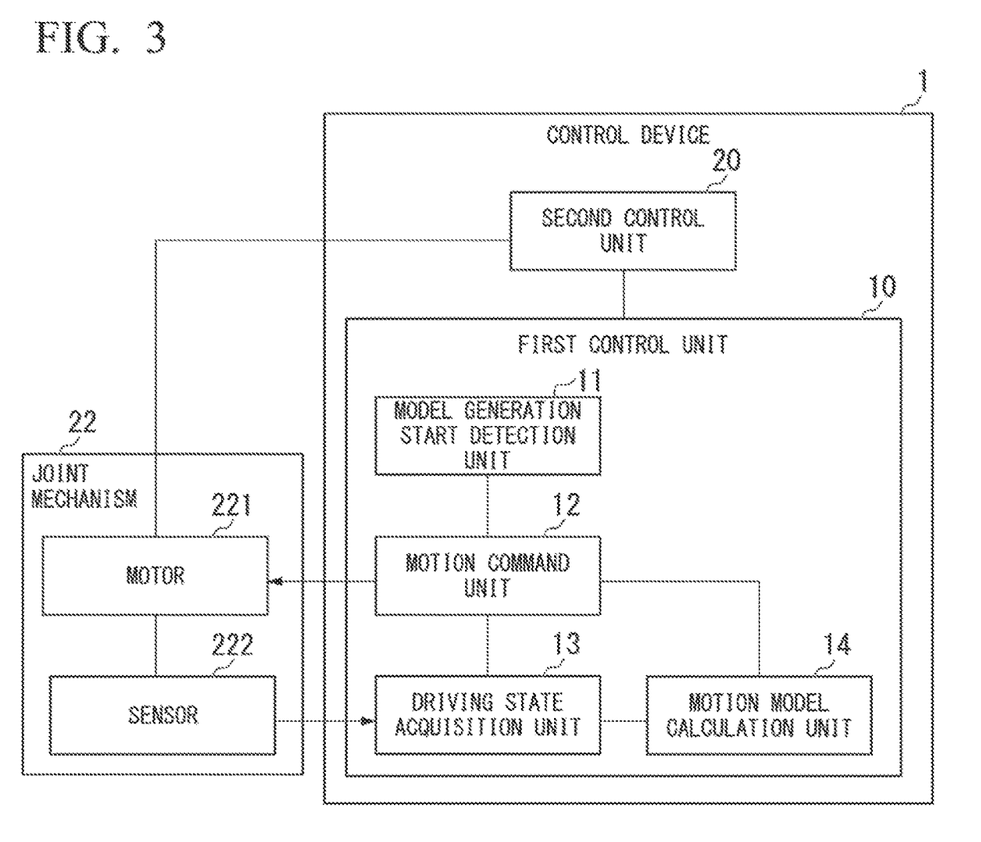
FIG. 3 is a functional block diagram of the control device and a joint mechanism according to the embodiment of the present invention.

FIG. 3 is a functional block diagram of the control device 1 and the joint mechanism 22.

The CPU 101 of the control device 1 starts up if a power supply is turned on and executes a scheduling program stored in advance. As a result, the control device 1 exhibits functions of a first control unit 10 and a second control unit 20. The first control unit 10 calculates a motion model. The second control unit 20 controls the joint mechanism 22 using a motion model generated using the first control unit 10. The first control unit 10 exerts functions of a model generation start detection unit 11, a motion command unit 12, a driving state acquisition unit 13, and a motion model calculation unit 14.

The model generation start detection unit 11 detects start of generation of a motion model of the robot arm 2. The motion model is data representing relationship between input values representing inputs to a joint mechanism of a robot arm including a plurality of arms and the joint mechanism which pivotally joins the plurality of arms to the connection part and output values of the joint mechanism with respect to the inputs.

The motion command unit 12 outputs a predetermined motion command to a motor 221 which is one aspect of an actuator of the joint mechanism.

The driving state acquisition unit 13 acquires a driving state of the joint mechanism 22 caused by a motion corresponding to a motion command from a sensor 222. The sensor is, for example, a torque sensor, a motor angle sensor, a motor angular velocity sensor, a load sensor, or the like.

The motion model calculation unit 14 calculates a motion model of each of the joint mechanisms 22 on the basis of the motion command and the driving state.

Figure 4:
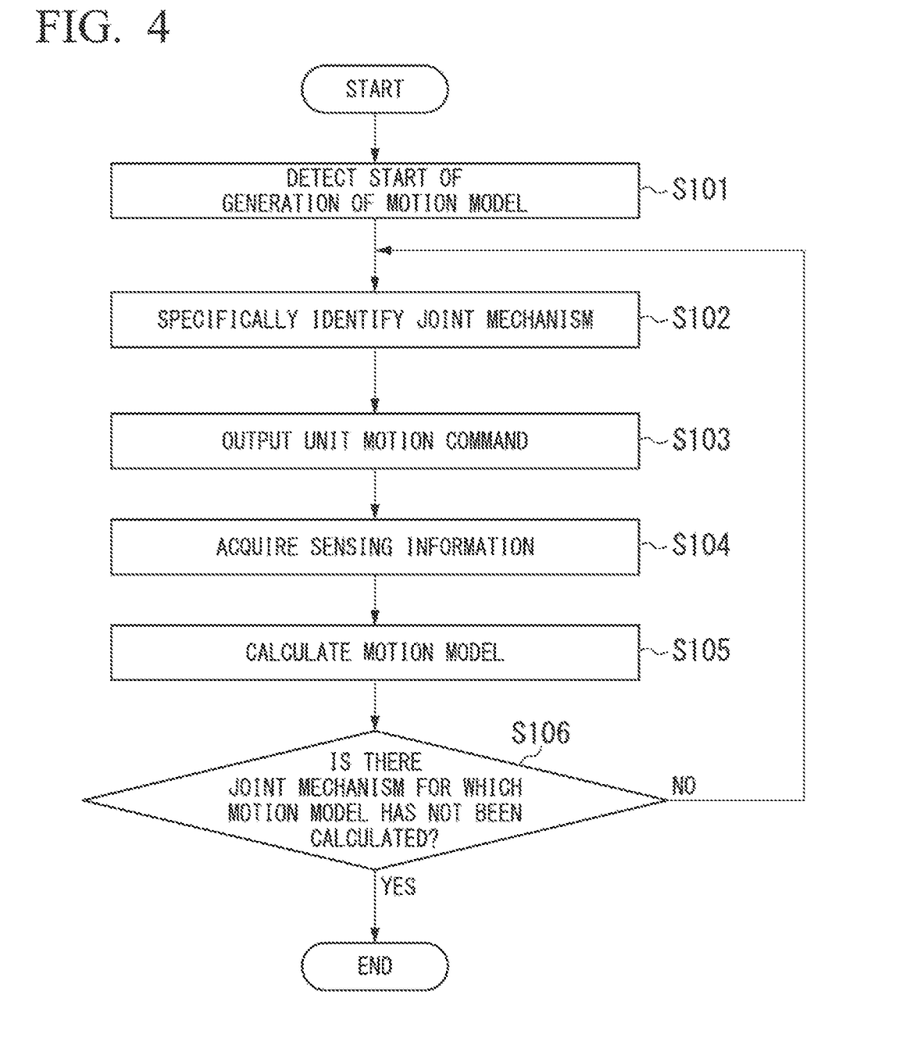
FIG. 4 is a diagram illustrating a processing flow of the control device according to the embodiment of the present invention.

FIG. 4 is a diagram illustrating a processing flow of the control device.

First, the model generation start detection unit 11 detects the start of generation of the motion model (Step S101). For example, if the unit is joined to the robot arm 2, the model generation start detection unit 11 detects conduction of an electric signal on the basis of the joining of the unit, thereby detecting the start of generation of the motion model. Alternatively, the user may operate an input device included in the control device 1 to provide an instruction regarding the start of generation and the model generation start detection unit 11 may detect the start of generation of the motion model on the basis of an input of information regarding this instruction. The model generation start detection unit 11 instructs the motion command unit 12 to start processing.

The motion command unit 12 identifies a joint mechanism 22 which receives a motion command to be output among the plurality of joint mechanism 22 which have been connected (Step S102). The motion command unit 12 may identify the joint mechanism as a target joint mechanism 22 which sequentially receives a motion command to be output from the joint mechanism 22 at a base of the robot arm 2 to a joint mechanism 22 joined in a distal end direction therefrom or may identify the joint mechanism as a target joint mechanism 22 which sequentially receives a motion command to be output from a joint mechanism 22 of the robot arm 2 joined in the distal end direction therefrom to a joint mechanism 22 thereof joined in a base direction therefrom. The motion command unit 12 may identify a joint mechanism 22 which receives a motion command to be output among the plurality of joint mechanisms 22 in a random manner regardless of a joining order in the robot arm 2.

The motion command unit 12 outputs a unit motion command to the identified joint mechanism 22 (Step S103).

The unit motion command may be a command for a predetermined motion unit. For example, the unit motion command may be a predetermined motion command used for controlling driving so that the motor is driven with a predetermined torque at a predetermined rotation angle and then an angle of the motor is returned to that of the same position as before rotation by rotating the motor in a reverse direction. The unit motion command may be determined using a voltage value, a current value, a charge time, or the like. The motion command unit 12 instructs the driving state acquisition unit 13 to start acquisition when outputting the unit motion command.

The sensor 222 acquires sensing information when the motor 221 of the joint mechanism 22 is driven through the unit motion command. The sensor 222 outputs the sensing information to the driving state acquisition unit 13. The driving state acquisition unit 13 acquires the sensing information from the sensor 222 (Step S104). The driving state acquisition unit 13 outputs the sensing information to the motion model calculation unit 14.

The motion model calculation unit 14 acquires the unit motion command and the sensing information. The motion model calculation unit 14 calculates a motion model on the basis of a relationship between the unit motion commands which are input values and the sensing information which is output values in the joint mechanisms 22 (Step S105).

A known system identification method may be used to calculate a motion model. Specific system identification methods include a partial space identification method such as a multiple variable output-error state space (MOESP) method and a numerical algorithms for subspace state space system identification (N4SID) method, a closed-loop subspace identification method such as a closed-loop subspace model identification (CL-MOESP) method and a predictor-based subspace identification (PBSID) method, an identification method in which a neural network is used, and the like. Furthermore, as a system identification method, the least squares method, a maximum likelihood method, and the like which are linear type models may be used. The motion model calculation unit 14 instructs the motion command unit 12 to determine whether an unprocessed joint mechanism 22 exists if calculating a motion model for one joint mechanism 22.

The motion model calculation unit 14 may estimate other parameters indicating a driving state of the joint mechanism 22 on the basis of the acquired sensing information and calculate a motion model using the parameters as output values. The other parameters indicating the driving state may be, for example, the length of the arm 21, a moment of inertia, a coefficient of static friction, viscosity parameters, elasticity parameters, and the like.

Also, the motion model calculation unit 14 may detect information (a joining state) such as a rotation angle and an inclination of an axis of the joined joint mechanism 22 from a current position on the basis of the acquired sensing information and calculate a motion model using these parameters.

The motion command unit 12 determines whether there is a joint mechanism 22 for which a motion model has not been calculated among all of the joint mechanisms 22 included in the robot arm 2 (Step S106). The motion command unit 12 identifies a next joint mechanism 22 when there is a joint mechanism 22 for which a motion model has not been calculated (NO in Step S106). Furthermore, the first control unit 10 repeatedly performs the process of Step S102 and the processes subsequent to the process of Step S102. Thus, the motion model calculation unit 14 calculates a motion model for all of the joint mechanisms 22 included in the robot arm 2. The first control unit 10 outputs data of a motion model for each joint mechanism 22 to the second control unit 20 when the motion command unit 12 determines that the motion command unit 12 has calculated the motion models of all of the joint mechanisms 22 (YES in Step S106). As a result, the process of calculating a motion model is completed.

The second control unit 20 generates a motion command for causing a predetermined motion using the motion model for the target joint mechanism 22 to be driven when the driving of the joint mechanism 22 is controlled in controlling the driving of the robot arm 2 and outputs the motion command to the joint mechanism 22.

According to the above-described processing, the control device 1 can easily create the motion model for the joint mechanisms included in the robot arm. The control device 1 described above is one aspect of the motion model calculation device.

Figure 5:
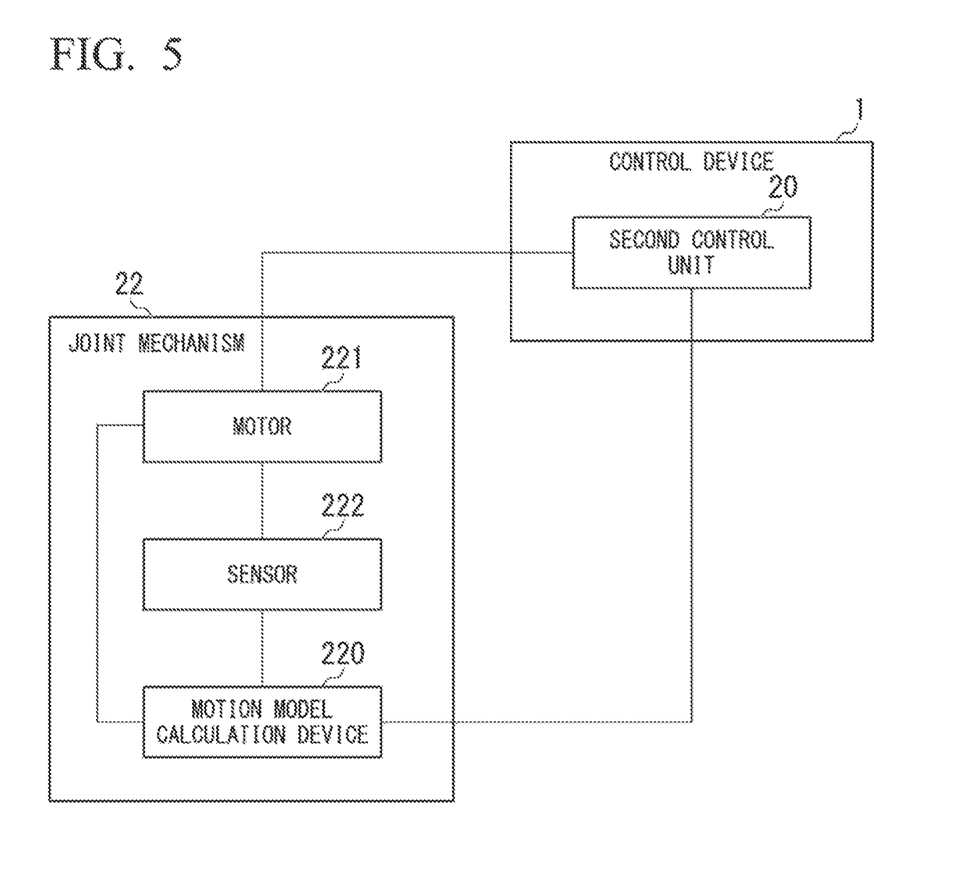
FIG. 5 is a diagram illustrating another example of a motion model calculation device according to the embodiment of the present invention.

FIG. 5 is a diagram illustrating another example of the motion model calculation device.

A motion model calculation device 220 having each function of the first control unit 10 included in the control device 1 described above may be provided inside the joint mechanism 22.

In this case, if the joint mechanism 22 is joined to the robot arm 2, the model generation start detection unit of the motion model calculation device 220 detects the start of generation of the motion model for the robot arm 2. Furthermore, the motion command unit for the motion model calculation device 220 outputs a predetermined motion command to the motor 221 which is one aspect of the actuator of the joint mechanism. The driving state acquisition unit of the motion model calculation device 220 acquires a driving state of the joint mechanism 22 through a motion corresponding to the motion command from the sensor 222. The sensor 222 is, for example, a torque sensor, a motor angle sensor, a motor angular velocity sensor, a load sensor, or the like. The motion model calculation unit of the motion model calculation device 220 calculates a motion model for each of the joint mechanisms 22 in the same manner as described above on the basis of the motion command and the driving state. In this case, the motion model calculation unit of the motion model calculation device 220 outputs the generated motion model to the control device 1. The second control unit 20 of the control device 1 controls the driving of the joint mechanism 22 using the motion model acquired from the motion model calculation device 220 of the joint mechanism 22.

Although the motion model for the joint mechanism of the robot arm 2 is calculated in the above processing, the control device 1 may calculate a motion model for a drive device of the robot other than the robot arm 2.

In this case, the control device 1 detects the start of generation of the motion model representing the relationship between the input value with respect to the drive device of the robot including the drive device and the output value of the drive device based on the input of the input value, outputs a predetermined unit motion command to the drive device, acquires the driving state of the drive device caused by the motion corresponding to the unit motion command, and calculates the motion model on the basis of the unit motion command and the driving state.

Figure 6:
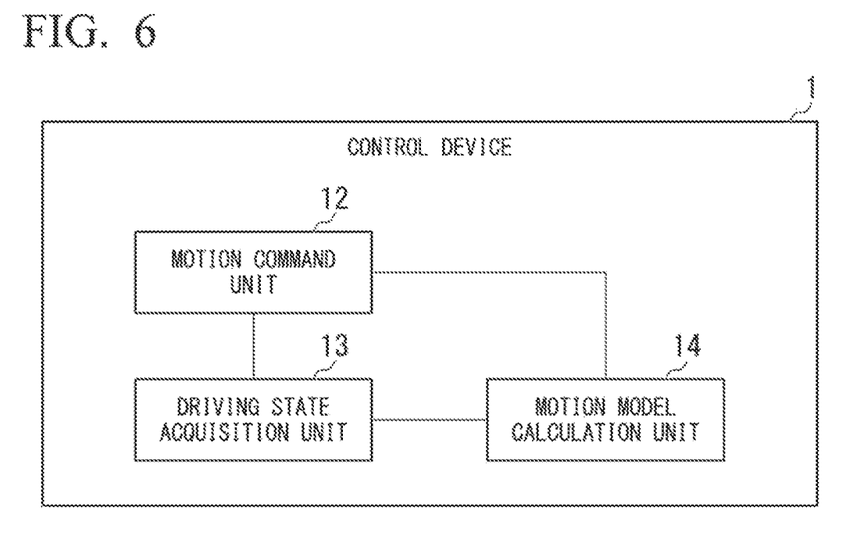
FIG. 6 is a diagram illustrating a minimum configuration of the control device according to the embodiment of the present invention.

FIG. 6 is a diagram illustrating a configuration included in the control device as described above with reference to FIG. 3, 5, or the like.

Figure 7:
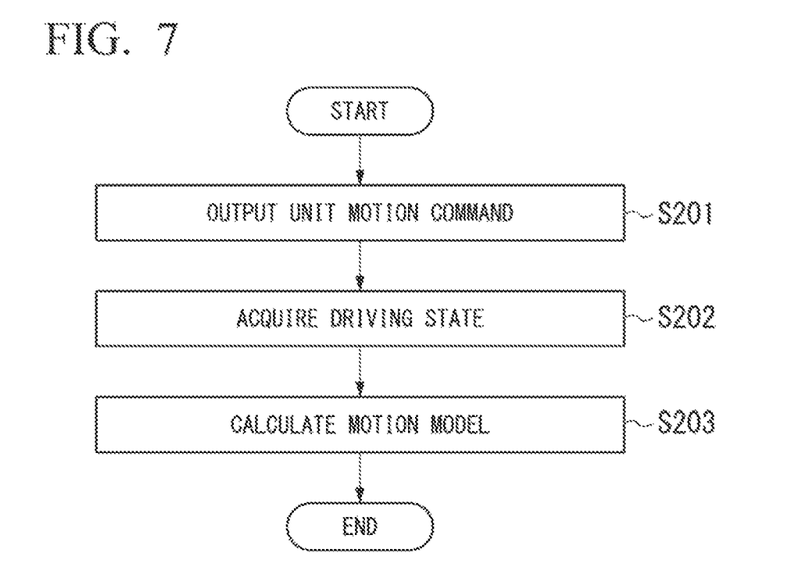
FIG. 7 is a diagram illustrating a processing flow using the control device of the minimum configuration according to the embodiment of the present invention.

FIG. 7 is a diagram illustrating a processing flow using the control device with a minimum configuration.

The control device 1 is connected to the robot arm 2 including the plurality of arms and the joint mechanisms which pivotally join the plurality of arms to the connection part and includes the motion command unit 12, the driving state acquisition unit 13, and the motion model calculation unit 14.

The motion command unit 12 outputs a predetermined unit motion command to the drive device (Step S201).

The driving state acquisition unit 13 acquires a driving state of the drive device caused by the motion corresponding to the unit motion command (Step S202).

The motion model calculation unit 14 calculates a motion model representing a relationship between an input value representing an input to the joint mechanism and an output value of the joint mechanism with respect to the input on the basis of the unit motion command and the driving state (Step S203).

The control device 1 as described above with reference to FIG. 6 can be implemented using the same functions as those of the control device as described above with reference to FIG. 3, FIG. 5, and the like.

Since the control device 1 illustrated in FIG. 6 is a device which calculates a motion model, the control device 1 is one aspect of the motion model calculation device.

The control device 1 described above includes a computer system. Moreover, the process of each of the above-described processes is stored in a computer-readable recording medium in a form of a program and the above processing is performed by reading and executing this program using a computer. Here, the computer-readable recording medium refers to a magnetic disk, a magneto-optical disk, a semiconductor memory, or the like. Furthermore, this computer program may be distributed to a computer via a communication line and the computer receiving the distribution may execute the program.

Also, the above program may be for realizing a part of the above-described functions. In addition, the above program may be something which can be realized in combination with the above-described functions and a program stored in the computer system in advance, that is, a so-called difference file (a difference program).

While the present invention has been described above with reference to the embodiments (and the examples), the present invention is not limited to the above embodiments (and the examples). Various changes which can be understood by a person of ordinary skill in the art can be provided within the scope of the present invention in terms of the structure and the details of the present invention.

REFERENCE SIGNS LIST

1 Control device (motion model calculation device)
10 First control unit
11 Model generation start detection unit (detection means)
12 Motion command unit (command means)
13 Driving state acquisition unit (acquisition means)
14 Motion model calculation unit (calculation means)
2 Robot arm
21 Arm
22 Joint mechanism

What is claimed is:

1. A motion model calculation device communicatively connected to a robot arm including a plurality of arms and joint mechanisms which pivotally join the plurality of arms to connection points, the motion model calculation device comprising:
a memory storing instructions; and
one or more processors connected to the memory and configured to execute the instructions to:
output a prescribed motion command when joining of an arm joint mechanism unit to the robot arm is detected, the arm joint mechanism unit including a combination of one of the arms and one of the joint mechanisms, the combination attachable to and detachable from the robot arm, the prescribed motion command output to the one of the joint mechanisms of the arm joint mechanism unit;
acquire a driving state of the one of the joint mechanisms caused by a motion corresponding to the motion command; and
calculate a motion model representing a relationship between an input value representing an input to the one of the joint mechanisms and an output value of the one of the joint mechanisms with respect to the input on the basis of the motion command and the driving state.

2. The motion model calculation device according to claim 1, wherein the one or more processors are configured to further execute the instructions to:
sequentially output the motion command to each of the joint mechanisms;
sequentially acquire the driving state caused by the motion corresponding to the motion command of each of the joint mechanisms; and
calculate the motion model of each of the joint mechanisms.

3. The motion model calculation device according to claim 1, wherein:
the motion model calculation device is connected to a sensor configured to sense the driving state included in the one of the joint mechanisms of the robot arm through communication, and
the one or more processors are configured to further execute the instructions to calculate the motion model of the one of the joint mechanisms.

4. The motion model calculation device according to claim 1, the one or more processors are configured to further execute the instructions to:
detect the start of generation of the motion model.

5. A joint mechanism, comprising:
a motion model calculation device communicatively connected to a robot arm including a plurality of arms, the joint mechanism and other joint mechanisms which pivotally join the plurality of arms to connection points, the motion model calculation device comprising:
a memory storing instructions; and
one or more processors connected to the memory and configured to execute the instructions to:
output a prescribed motion command when joining of an arm joint mechanism unit to the robot arm is detected, the arm joint mechanism unit including a combination of one of the arms and the joint mechanism, the combination attachable to and detachable from the robot arm, the prescribed motion command output to the joint mechanism;
acquire a driving state of the joint mechanism caused by a motion corresponding to the motion command; and
calculate a motion model representing a relationship between an input value representing an input to the joint mechanism and an output value of the joint mechanism with respect to the input on the basis of the motion command and the driving state.

6. A motion model calculation method performed by a motion model calculation device communicatively connected to a robot arm including a plurality of arms, the joint mechanism and other joint mechanisms which pivotally join the plurality of arms to connection points, the motion model calculation method comprising:

outputting a prescribed motion command when joining of an arm-joint mechanism unit to the robot arm is detected, the arm joint mechanism unit including a combination of one of the arms and one of the joint mechanisms, the combination attachable to and detachable from the robot arm, the prescribed motion command output to the one of the joint mechanisms of the arm joint mechanism unit;

acquiring a driving state of the one of the joint mechanisms caused by a motion corresponding to the motion command; and calculating a motion model representing a relationship between an input value representing an input to the one of the joint mechanisms and an output value of the one of the joint mechanisms with respect to the input on the basis of the motion command and the driving state.

* * * * *